Aug. 2, 1932.  L. LEFEVRE ET AL  1,869,487
FUEL SUPPLYING APPARATUS FOR AIRCRAFT
Filed Feb. 8, 1929   2 Sheets-Sheet 1

Leon Lefevre & William E. Leas INVENTORS
BY Victor J. Evans
THEIR ATTORNEY

Aug. 2, 1932.　　　L. LEFEVRE ET AL　　　1,869,487
FUEL SUPPLYING APPARATUS FOR AIRCRAFT
Filed Feb. 8, 1929　　2 Sheets-Sheet 2

Leon Lefevre & William E. Leas INVENTORS
BY Victor J. Evans
THEIR ATTORNEY

Patented Aug. 2, 1932

1,869,487

UNITED STATES PATENT OFFICE

LEON LEFEVRE AND WILLIAM E. LEAS, OF CHICAGO, ILLINOIS

FUEL SUPPLYING APPARATUS FOR AIRCRAFT

Application filed February 8, 1929. Serial No. 338,554.

This invention relates to certain novel improvements in fuel supplying apparatus for aircrafts and has for its principal object the provision of an improved construction of this character which will be highly efficient in use and economical in manufacture.

It is among the objects of our invention to provide a device of the above named character which will be arranged in a manner such that an aircraft may be supplied with fuel while it is in motion so as to obviate the necessity of such devices being brought to an at rest position on the ground.

Another object of our invention is to provide a device of the above named character which will embody means for properly orienting the aircraft in order to facilitate the carying out of the above set forth object.

A further object of the invention is to arrange a device of the above named character in a manner such that it will embody a revolvable portion in order that the craft may travel in a circuitous path during the time fuel is being supplied thereto through the device.

Other objects will appear hereinafter.

The invention consists in the novel combination and arrangement of parts to be hereinafter described and claimed.

The invention will be best understood by reference to the accompanying drawings, showing the preferred form of construction and in which.

Figure 1:
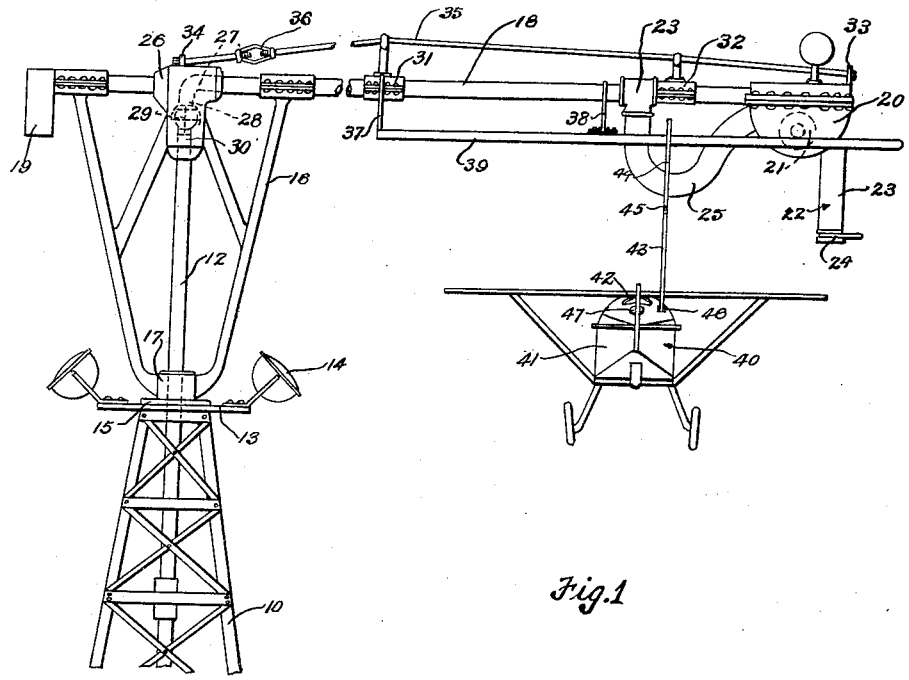
Fig. 1 is a side elevational view depicting a preferred form of construction for my invention.
Figure 1:
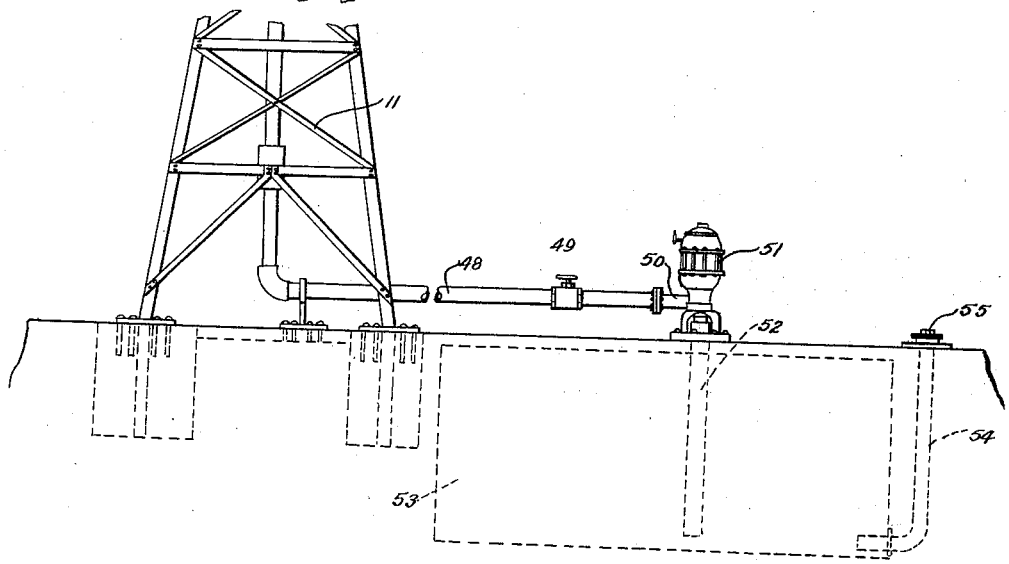

In the accompanying drawings wherein we have illustrated a preferred form of construction for our invention 10 generically indicates a tower structure which in the present instance is formed so as to be substantially rectangular in cross-section and which is arranged so as to be wider at the base portion than at the upper end. Suitable reenforcing strips 11 are employed for reenforcing the tower structure 10. A pipe structure 12 is directed up through the tower structure 10 and includes a portion which projects beyond the upper end of the tower 10.

At the upper end of the tower 10 a bracket structure 13 is provided which in the present instance supports four lamps indicated by 14 the utility of which will be set forth hereinafter.

At the upper end of the tower 10 a suitable bearing structure 15 is provided. A bracket 16 includes a bearing 17 that is associated with the bearing strucure 15 in a manner such that the bracket 16 will be arranged for rotation relative to the tower structure 10 and the pipe 12. At the upper end of the bracket structure 16 there is fixed a horizontal member 18 which extends outwardly in one direction from the tower 10. On the side of the bracket structure 16 opposite that from which the member 18 extends a counter-balance 19 is arranged.

At the outer end of the member 18 there is arranged a housing 20 in which a self-winding reel structure of approved form indicated by 21 is arranged. A suitable flexible conduit or hose 22 is arranged on the self-winding reel structure 21 and includes a portion 23 which extends from the housing 20 and this portion 23 has a suitable valve structure 24 arranged at the free end thereof for a purpose to be set forth hereinafter. The opposite end portion 25 of the hose 22 is led from the housing 20 to a coupling 23 which is arranged in the member 18. The member 18 is arranged so that the portion thereof extending between the housing 26, that is disposed in alignment with the pipe 12, and the coupling 23 provides a conduit and the portion 27 of this member 18 is arranged within the housing 26 and includes a downwardly depending portion 28 which terminates in a cap member 29 of a swivel connection on the upper end of the pipe 12. A cap member 30 is provided which cooperates with the cap member 29 and permits rotative movement of the member 18 relative to the pipe 12 while preventing leakage from passing this connection.

Brackets 31 and 32 are provided on the member 18 and a bracket 33 is provided on the housing 20. A bracket 34 is provided on the housing 26. A reenforcing member 35 extends between these brackets and a turn buckle 36 is provided in this brace 35 so as to permit tightening of the brace member 35 to facilitate the supporting of the member 18.

Figure 2:
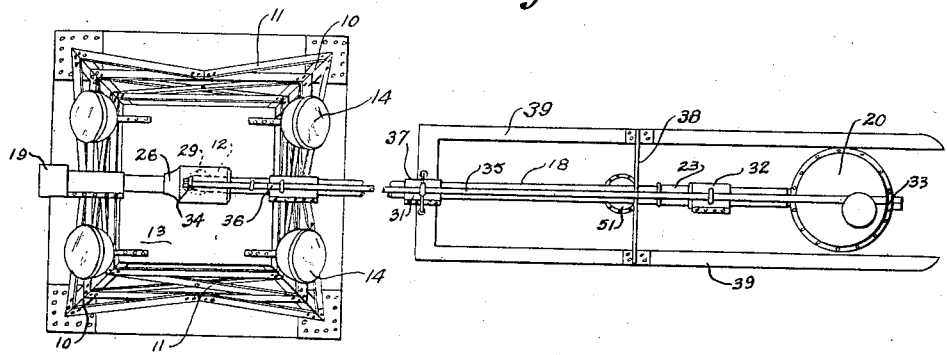
Fig. 2 is a plan view of the device as illustrated in Fig. 1.

Suitable bracket structures 37 and 38 depend from the member 18 and support the substantially rectangular guide member 39 in a substantially horizontal position. The guide member includes arms which extend parallel to but in spaced relation with the member 18 and which enclose the housing 20 as clearly illustrated in Fig. 2 and the utility of this guide structure 39 will be set forth presently.

Figure 3:
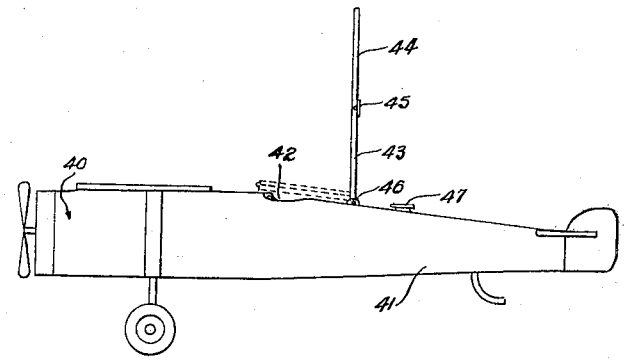
Fig. 3 is a side elevational view of a typical aircraft intended to cooperate with our improved device.

A typical aircraft intended to cooperate with a structure of the foregoing type is indicated by 40 in the drawings and includes a fuselage 41 in which usual cockpits 42 are provided. Arranged adjacent the rear cockpit 42 is a guide arm comprising of sections 43 and 44 which are pivotally connected together as indicated at 45. The lower end of the arm 43 is pivotally attached to the fuselage 41 as indicated at 46. The pivotal connections 45 and 46 are arranged so that they will prevent movement rearwardly of the vertical position of the arms 43 and 44 as indicated in Fig. 3 and these pivotal connections permit the guide structure to be arranged in a folded position as indicated by dotted lines in Fig. 3. A suitable filling cap 47 is arranged rearwardly of the cockpit 42 which affords access to the fuel tank of the aircraft 40.

The lower end portion of the pipe 12 which is indicated by 48 has a suitable shut-off valve 49 provided therein and is connected to the outlet 50 of a suitable pump structure 51. The inlet 52 of the pump structure 51 extends into a suitable storage tank 53 which has the usual filler pipe 54 communicating therewith that is closed by the cap 55.

This device is used in connection with refueling aircrafts while they are in motion so as to obviate the necessity of the craft landing and this is accomplished in the following manner. An aircraft desiring to refuel will appraise the operator of this structure of this fact. The person occupying the rear cockpit 42 of the aircraft will then move the arms 43 and 44 into the vertical position depicted in Fig. 3 and the craft will then be caused to approach the structure so as to bring about engagement of the guide arms with the guide structure 39. As soon as the guide arms engage the guide structure the craft is arranged so as to travel in a circuitous path which will cause the member 18 and the bracket 16 to rotate relative to the tower 10 and the pipe 12 and the guide arms carried by the craft are caused to travel along the guide structure 39 until the craft attains a position near the outer end of said guide structure at which time the occupant of the cockpit 42 will grip the end portion 23 of the conduit 22 and will withdraw this conduit 22 from the reel 21 and will establish communication between the filler arrangement 47 and the end of the portion 23 and as soon as this communication is established the valve 24 will be opened. The pump 51 will be operating and will be withdrawing fuel from the storage tank 53 and forcing the same through the outlet 50 and the pipe 12 to the conduit 18, through the coupling 23 into the conduit 22. As soon as the desired amount of fuel has been introduced into the fuel tank of the aircraft the valve 24 will be closed and operation of the pump 51 will be interrupted and the aircraft will be caused to travel so as to disengage the guide arms from the guide structure 39 and the craft will continue in its flight. The lamps 14 are disposed so as to illuminate the area through which the member 18 travels and this will permit usage of the device at night.

It is apparent from the foregoing description that we have provided a construction which will permit the refueling of an aircraft while the same is in motion without requiring landing thereof and this device is arranged in a manner such that the foregoing construction may be expeditiously carried out.

While we have illustrated and described the preferred form of construction for carrying our invention into effect, this is capable of variation and modification, without departing from the spirit of the invention. We, therefore, do not wish to be limited to the precise details of construction set forth, but desire to avail ourselves of such variations and modifications as come within the scope of the appended claims.

Having thus described our invention what we claim as new and desire to protect by Letters Patent is:

1. In a device of the class described, a vertical supporting structure, a horizontal supporting structure supported by and rotative relative to said vertical supporting structure, and means carried by said structures for directing fuel to a flexible conduit structure mounted adjacent the free end of said horizontal supporting structure.

2. In a device of the class described, a vertical supporting structure, a horizontal supporting structure, means for supporting said horizontal supporting structure for rotative movement relative to said vertical supporting structure, a flexible conduit carried adjacent the free end of said horizontal supporting structure, and means carried by said vertical and said horizontal supporting structures for directing fuel to said flexible conduit.

3. In a device of the class described, a vertical supporting structure, a horizontal supporting structure, means for supporting said horizontal supporting structure for rotative movement relative to said vertical supporting structure, a conduit in said vertical supporting structure, a conduit in said horizontal supporting structure, means for interconnecting said conduit to establish communication therebetween arranged to permit rotative movement of the conduit in said horizontal supporting structure relative to the conduit in said vertical supporting structure, and a flexible conduit connected to the free end of the conduit in said horizontal supporting structure.

4. In a device of the class described, a vertical supporting structure, a horizontal supporting structure, means for supporting said horizontal supporting structure for rotative movement relative to said vertical supporting structure, a conduit in said vertical supporting structure, a conduit in said horizontal supporting structure, means for interconnecting said conduit to establish communication therebetween arranged to permit rotative movement of the conduit in said horizontal supporting structure relative to the conduit in said vertical supporting structure, means for storing a flexible conduit at the end of said horizontal supporting structure, and means for interconnecting said flexible conduit carried by said supporting means to the conduit in said horizontal supporting structure.

5. In a device of the class described, a vertical supporting structure, a horizontal supporting structure, means for supporting said horizontal supporting structure for rotative movement relative to said vertical supporting structure, a conduit in said vertical supporting structure, a conduit in said horizontal supporting structure, means for interconnecting said conduit to establish communication therebetween arranged to permit rotative movement of the conduit in said horizontal supporting structure relative to the conduit in said vertical supporting structure, means for storing a flexible conduit at the end of said horizontal supporting structure, and means for interconnecting said flexible conduit carried by said supporting means to the conduit in said horizontal supporting structure, means for forcing a fluid through said conduits, and valve means controlling passage through said conduits.

6. In a device of the class described, a vertical supporting structure, a horizontal supporting structure, means for supporting said horizontal supporting structure for rotative movement relative to said vertical supporting structure, guide members associated with said horizontal supporting structure, means for directing a fluid to the end of said horizontal supporting structure, and means for controlling passage through said conduit structures.

7. In a device of the class described, a vertical supporting structure, a horizontal supporting structure, means for supporting said horizontal supporting structure for rotative movement relative to said vertical supporting structure, guide members associated with said horizontal supporting structure, means for directing a fluid to the end of said horizontal supporting structure, and means for controlling passage through said conduit structures, in combination with guide means on an aircraft, said guide means on said aircraft engaging said first named guide means to align said aircraft with said conduit structures.

8. In a device of the character described, a rotatable member, means thereon arranged for detachable connection with a flying machine during flight thereof, and means carried by the member for placing the machine in communication with a source of fuel supply while attached to said first means.

9. A refueling station for aeroplanes in flight, comprising a substantially horizontal arm rotatively supported materially above the ground, a hose for connection with a supply of gasoline and supported on the arm, and a means for preventing a twisting of the hose as an aeroplane flying around the pivot of the arm receives a supply of gasoline.

10. A refueling station for aeroplanes in flight comprising a rotatable arm spaced materially from the ground and a flexible hose supported by said arm and extendable therefrom.

11. A refueling station for aeroplanes in flight comprising a rotatable arm spaced materially from the ground, a flexible hose supported by said arm and means permitting extension of said hose from said arm, said means comprising a reel on which a portion of said hose is stored.

In testimony whereof we affix our signatures.

LEON LEFEVRE.
WILLIAM E. LEAS.